(12) United States Patent
Kim et al.

(10) Patent No.: US 10,492,092 B2
(45) Date of Patent: Nov. 26, 2019

(54) METHOD FOR REPORTING CHANNEL STATE INFORMATION IN WIRELESS ACCESS SYSTEM SUPPORTING UNLICENSED BAND, AND APPARATUS FOR SUPPORTING SAME

(71) Applicant: LG ELECTRONICS INC., Seoul (KR)

(72) Inventors: Seonwook Kim, Seoul (KR); Joonkui Ahn, Seoul (KR); Suckchel Yang, Seoul (KR); Hanbyul Seo, Seoul (KR); Seungmin Lee, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 15/517,510

(22) PCT Filed: Oct. 5, 2015

(86) PCT No.: PCT/KR2015/010494
§ 371 (c)(1),
(2) Date: Apr. 6, 2017

(87) PCT Pub. No.: WO2016/056802
PCT Pub. Date: Apr. 14, 2016

(65) Prior Publication Data
US 2017/0332267 A1  Nov. 16, 2017

Related U.S. Application Data

(60) Provisional application No. 62/060,521, filed on Oct. 6, 2014.

(51) Int. Cl.
*H04W 24/10* (2009.01)
*H04W 72/12* (2009.01)
(Continued)

(52) U.S. Cl.
CPC ............ *H04W 24/10* (2013.01); *H04L 5/00* (2013.01); *H04L 5/001* (2013.01); *H04L 5/005* (2013.01);
(Continued)

(58) Field of Classification Search
CPC ... H04W 24/10; H04W 72/1289; H04J 11/00; H04L 5/00
(Continued)

(56) References Cited

U.S. PATENT DOCUMENTS

2012/0244903 A1* 9/2012 Fong ............... H04W 8/20
455/517
2013/0279433 A1* 10/2013 Dinan .............. H04W 52/146
370/329

(Continued)

FOREIGN PATENT DOCUMENTS

WO  2012157994  11/2012
WO  2014051378  4/2014

OTHER PUBLICATIONS

PCT International Application No. PCT/KR2015/010494, Written Opinion of the International Searching Authority dated Jan. 21, 2016, 18 pages.
(Continued)

*Primary Examiner* — Mark H Rinehart
*Assistant Examiner* — Kokou R Detse
(74) *Attorney, Agent, or Firm* — Lee, Hong, Degerman, Kang & Waimey

(57) ABSTRACT

The present invention relates to a wireless access system supporting an unlicensed band, and provides a method for reporting channel state information (CSI) on the basis of a CSI measurement set, and apparatuses for supporting the method. The method comprising receiving an upper layer signal including CSI subframe set configuration information
(Continued)

through a primary cell (Pcell); measuring CSI on a secondary cell (Scell) in a preoccupation access period (PAP) or a non-PAP on the basis of the CSI subframe set configuration information; and transmitting a CSI report including the measured CSI. At this time, the non-PAP is set as a first CSI subframe set, the PAP is set as a second CSI subframe set, the first CSI subframe set and the second CSI subframe set are set in the terminal through the CSI subframe set configuration information, and the Scell can be configured in an unlicensed band.

10 Claims, 16 Drawing Sheets

(51) Int. Cl.
*H04L 5/00* (2006.01)
*H04L 5/14* (2006.01)
(52) U.S. Cl.
CPC ....... *H04L 5/0048* (2013.01); *H04W 72/1289* (2013.01); *H04L 5/0098* (2013.01); *H04L 5/1469* (2013.01)

(58) Field of Classification Search
USPC .......................................................... 370/395
See application file for complete search history.

(56) References Cited

U.S. PATENT DOCUMENTS

2013/0315114 A1* 11/2013 Seo ......................... H04L 5/001
370/280
2014/0092787 A1* 4/2014 Han ......................... H04W 4/70
370/280
2014/0204869 A1 7/2014 Lin

OTHER PUBLICATIONS

LG Electronics, "Remaining issues for aperiodic CSI triggering", R1-110365, 3GPP TSG RAN WG1 Meeting #63bis, Jan. 2011, 2 pages.
Mediatek Inc., "Working Assumption for Aperiodic CSI Reporting in Subframe", R1-110141, 3GPP TSG RAN WG1 Meeting #63bis, Jan. 2011, 3 pages.

* cited by examiner

FIG. 4
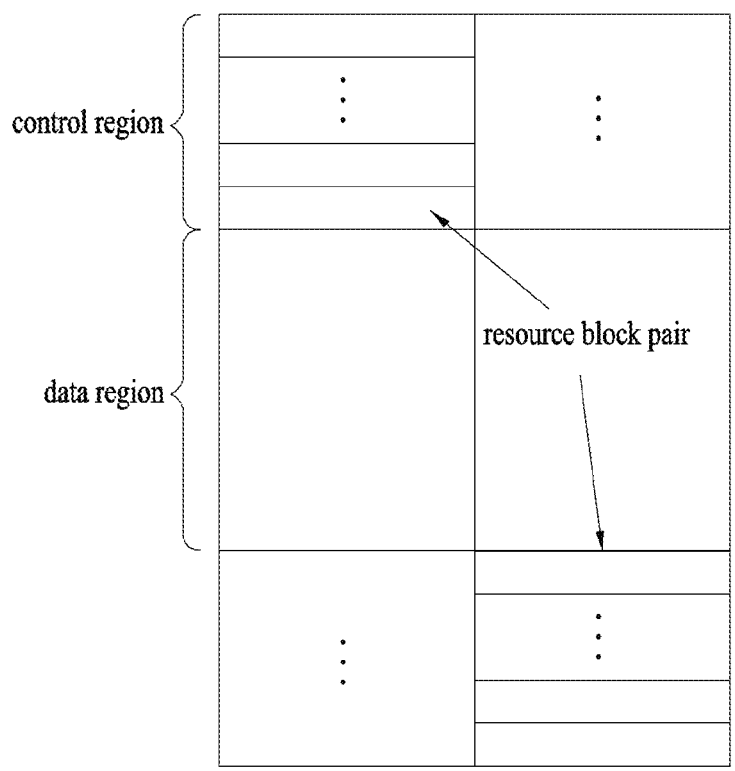
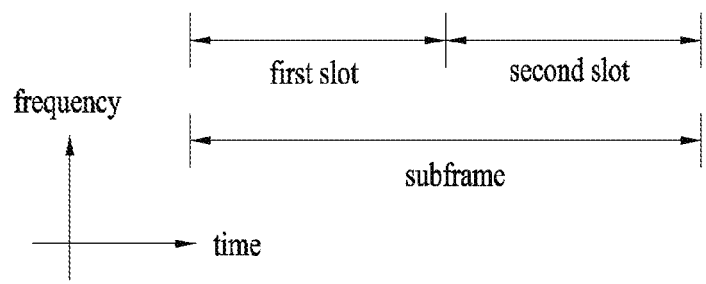

FIG. 9
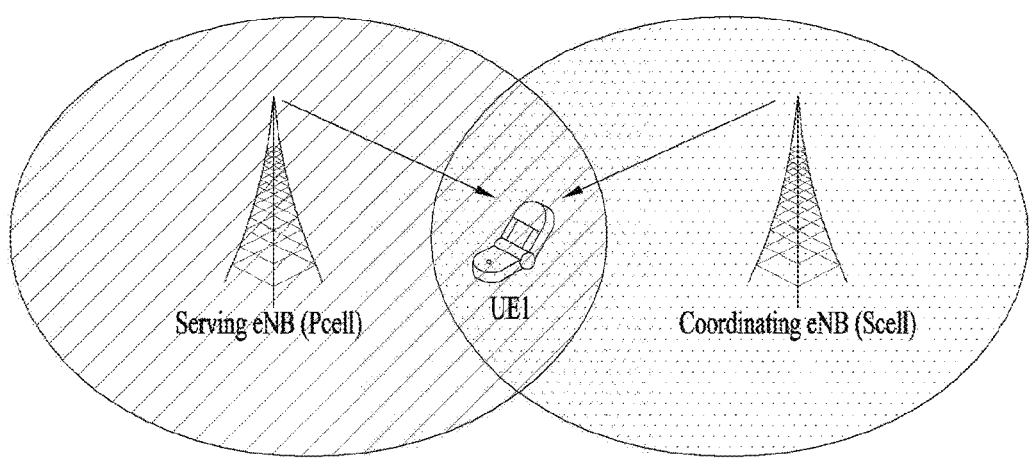
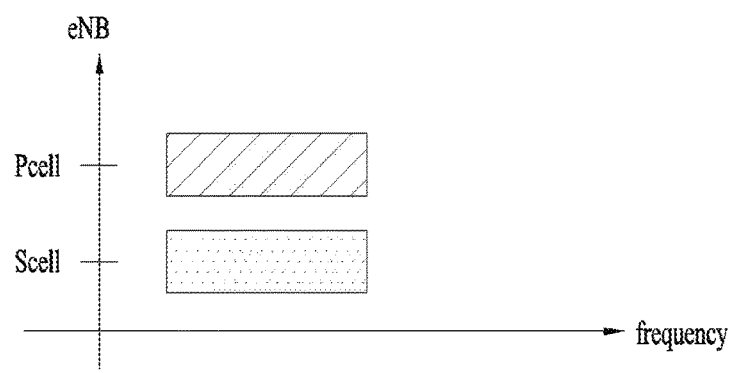

METHOD FOR REPORTING CHANNEL STATE INFORMATION IN WIRELESS ACCESS SYSTEM SUPPORTING UNLICENSED BAND, AND APPARATUS FOR SUPPORTING SAME

CROSS-REFERENCE TO RELATED APPLICATIONS

This application is the National Stage filing under 35 U.S.C. 371 of International Application No. PCT/KR2015/010494, filed on Oct. 5, 2015, which claims the benefit of U.S. Provisional Application No. 62/060,521, filed on Oct. 6, 2014, the contents of which are all hereby incorporated by reference herein in their entirety.

TECHNICAL FIELD

The present invention relates to a wireless access system supporting an unlicensed band, and more particularly, to a method of reporting CSI (Channel State Information) based on a CSI measurement set and an apparatus therefor.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Tasks

The present invention relates to a wireless access system supporting an unlicensed band, and more particularly, to a method of reporting CSI (Channel State Information) and an apparatus therefor.

An object of the present invention is to provide a method of efficiently transmitting and receiving data in a wireless access system supporting an unlicensed band and a licensed band.

Another object of the present invention is to provide a method of dividing an unlicensed band into a preoccupation access period (PAP) and a non-preoccupation access period (non-PAP) in a time axis and a method of configuring a subframe measurement set in the PAP and/or the non-PAP.

Another object of the present invention is to provide a method of performing periodic or aperiodic CSI reporting in a restricted CSI measurement set when the restricted CSI measurement set is configured.

Another object of the present invention is to provide a method of performing periodic or aperiodic CSI reporting when a restricted CSI measurement set is not configured.

Another object of the present invention is to provide a method of sharing configuration information on a PAP and a non-PAP between eNBs or cells.

The other object of the preset invention is to provide apparatuses supporting the aforementioned methods.

It will be appreciated by persons skilled in the art that the objects that could be achieved with the present disclosure are not limited to what have been particularly described hereinabove and the above and other objects that the present disclosure could achieve will be more clearly understood from the following detailed description.

Technical Solution

The present invention relates to a wireless access system supporting an unlicensed band, and more particularly, to a method of reporting CSI (Channel State Information) based on a CSI measurement set and an apparatus therefor.

To achieve these and other advantages and in accordance with the purpose of the present invention, as embodied and broadly described, according to one embodiment, a method of reporting channel state information (CSI), which is reported by a user equipment in a wireless access system supporting an unlicensed band, includes the steps of receiving an upper layer signal including CSI subframe set configuration information from an evolved Node B (eNB) via a primary cell (PCell), measuring CSI on a secondary cell (SCell) in a preoccupied access period (PAP) or a non-PAP based on the CSI subframe set configuration information, and transmitting a CSI report including the measured CSI to the eNB. In this case, the non-PAP is configured by a first CSI subframe set, the PAP is configured by a second CSI subframe set, the first CSI subframe set and the second CSI subframe set are set to the user equipment through the CSI subframe set configuration information, and the SCell can be configured in the unlicensed band.

To further achieve these and other advantages and in accordance with the purpose of the present invention, according to a different embodiment, a user equipment for reporting channel state information (CSI) in a wireless access system supporting an unlicensed band includes a transmitter, a receiver, and a processor configured to report the CSI in a manner of being functionally connected with the transmitter and the receiver, the processor configured to control the receiver to receive an upper layer signal including CSI subframe set configuration information from an evolved Node B (eNB) via a primary cell (PCell), the processor configured to measure CSI on a secondary cell (SCell) in a preoccupied access period (PAP) or a non-PAP based on the CSI subframe set configuration information, the processor configured to control the transmitter to transmit a CSI report including the measured CSI to the PCell or the SCell. In this case, the non-PAP is configured by a first CSI subframe set, the PAP is configured by a second CSI subframe set, the first CSI subframe set and the second CSI subframe set are set to the user equipment through the CSI subframe set configuration information, and the SCell can be configured in the unlicensed band.

The PAP corresponds to a period during which data is transmitted and received irrespective of whether or not the SCell is in an idle state and the non-PAP can be configured by a period during which data is transmitted and received only in a transmission opportunity (TxOP) period in which the SCell is an idle state.

If the CSI report corresponds to a periodically transmitted periodic report, the user equipment can be configured to transmit the CSI report to a base station by measuring CSI on the second CSI subframe set only.

If the CSI report corresponds to a periodically transmitted periodic report, the user equipment can transmit the CSI report to a base station by measuring CSI in the TxOP belonging to the first CSI subframe set.

If the CSI report corresponds to an aperiodic CSI report which is reported upon a request of a base station, the user equipment can receive a physical downlink control channel including an aperiodic CSI request field from the PCell and the aperiodic CSI request field can be configured to request a CSI report on the first CSI subframe set or the second CSI subframe set.

The user equipment can be configured to perform interference measurement on a neighboring cell in the second subframe set only.

The user equipment can receive downlink data from the SCell. In this case, a power control parameter for transmitting the downlink data is differently configured depending on the first subframe set and the second subframe set.

The above-described aspects of the present invention are merely some parts of the embodiments of the present invention and various embodiments into which the technical features of the present invention are incorporated can be derived and understood by persons skilled in the art from the following detailed description of the present invention.

Advantageous Effects

Accordingly, the present invention provides the following effects or advantages.

Accordingly, the present invention provides the following effects or advantages.

First of all, it is able to efficiently transmit and receive data in a wireless access system supporting an unlicensed band and a licensed band.

Second, it is able to efficiently manage an unlicensed band by dividing the unlicensed band into a preoccupation access period (PAP) and a non-preoccupation access period (non-PAP) in a time axis and configuring a subframe measurement set in the PAP and/or the non-PAP.

Third, it is able to perform periodic or aperiodic CSI reporting in a restricted CSI measurement set according to characteristics of an unlicensed band when the restricted CSI measurement set is configured.

Fourth, it is able to minimize inter-cell interference or inter-eNB interference by sharing configuration information on a PAP and a non-PAP between eNBs or cells.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. That is, those skilled in the art can derive unintended effects resulting from implementation of the present disclosure from the embodiments of the present disclosure.

DESCRIPTION OF DRAWINGS

The accompanying drawings, which are included to provide a further understanding of the disclosure, illustrate embodiments of the disclosure and together with the description serve to explain the principle of the disclosure. In the drawings:

FIG. 4 is a view illustrating an exemplary structure of an uplink subframe;

FIG. 9 is a conceptual view of a Coordinated Multi-Point (CoMP) system operating in a CA environment;

BEST MODE

Mode for Invention

Figure 1:
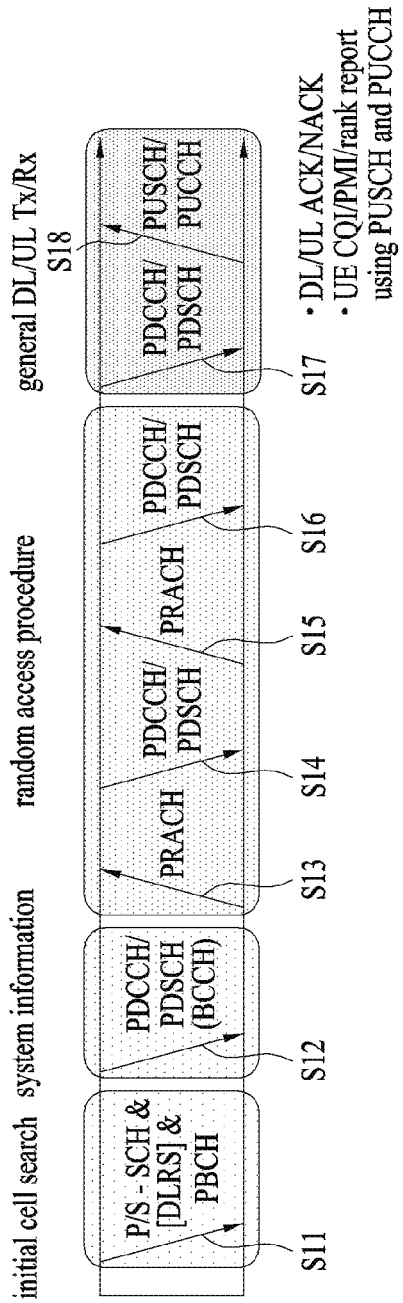
FIG. 1 is a view illustrating physical channels and a signal transmission method using the physical channels.

The present invention relates to a wireless access system supporting an unlicensed band. The present invention proposes a method of reporting CSI (Channel State Information) based on a CSI measurement set and an apparatus therefor.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (WiFi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
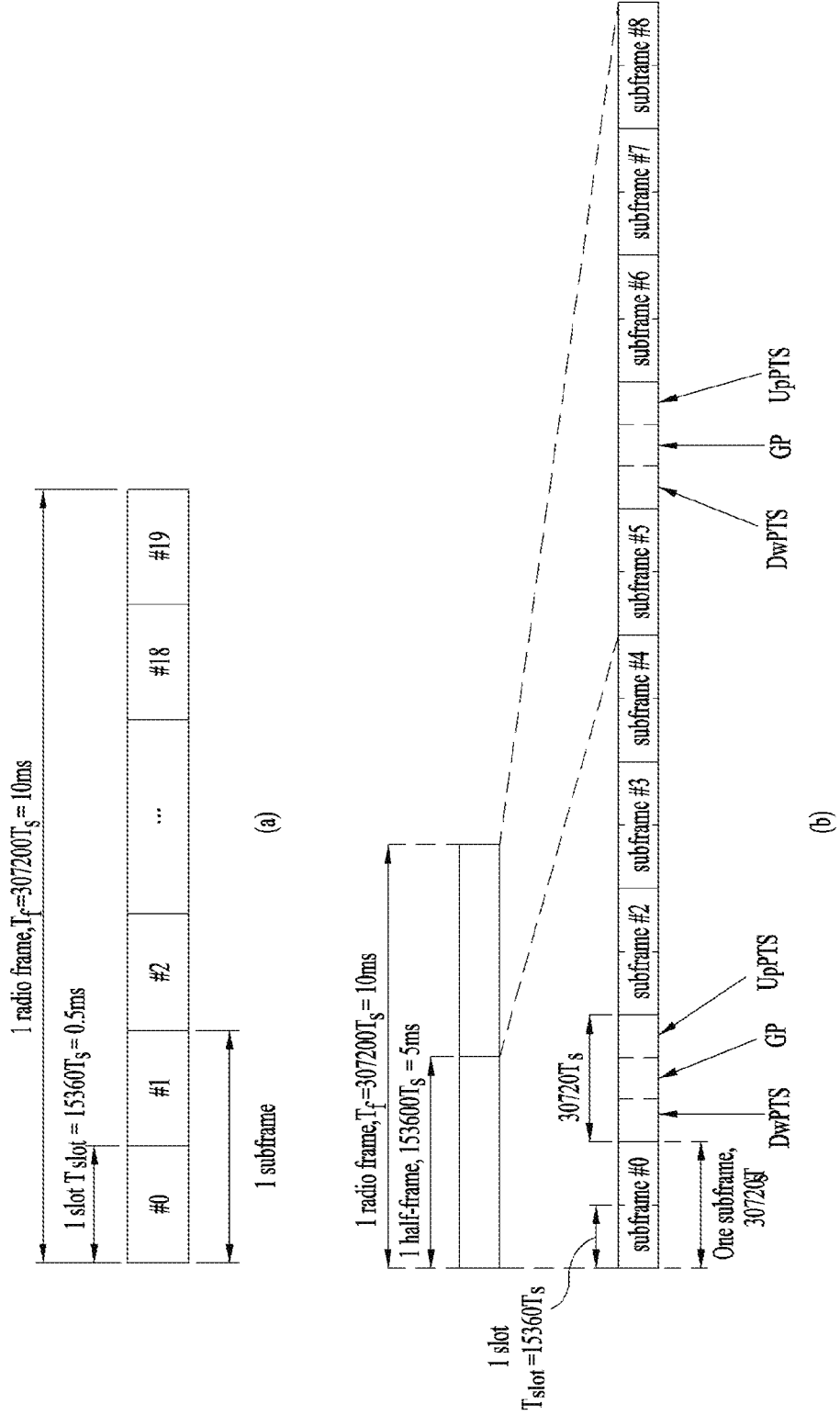
FIG. 2 is a view illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | 12800·$T_s$ | | |
| 8 | 24144·$T_s$ | | | — | — | — |
| 9 | 13168·$T_s$ | | | — | — | — |

Figure 3:
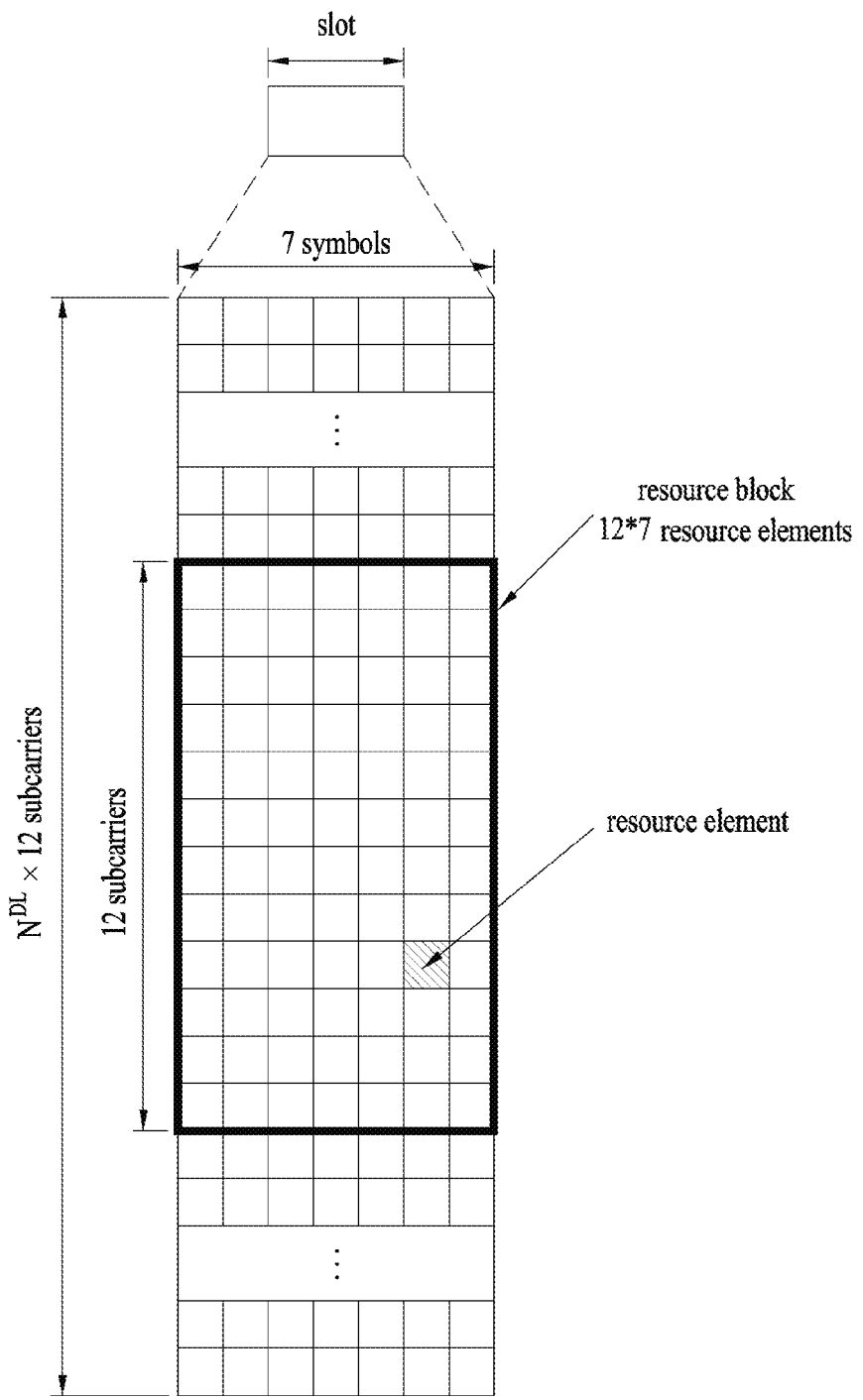
FIG. 3 is a view illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain.

A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
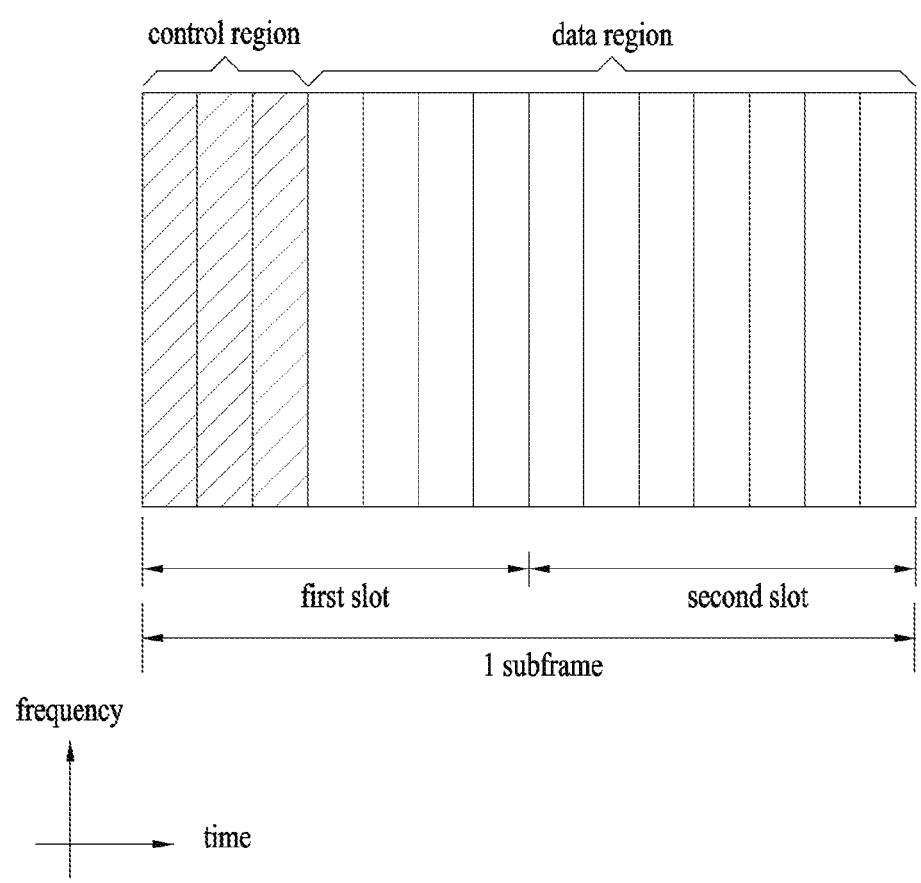
FIG. 5 is a view illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| PDCCH format | Number of CCE (n) | Number of REG | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which is not based on a codebook (Rel-8);
(8) Transmission mode 8: Precoding supporting up to two layers, which are not based on a codebook (Rel-9);
(9) Transmission mode 9: Precoding supporting up to eight layers, which are not based on a codebook (Rel-10); and
(10) Transmission mode 10: Precoding supporting up to eight layers, which are not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then, the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting position of a USS.

[Table 4] illustrates the sizes of CSSs and USSs.

TABLE 4

| PDCCH Format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\} + i \qquad \text{[Equation 1]}$$

Herein, $M^{(L)}$ is the number of PDCCH candidates with CCE aggregation level L to be monitored in the SS, $m=0, \ldots, M^{(L)}-1$ is the index of a CCE in each PDCCH candidate, and $i=0, \ldots, L-1$. $k=\lfloor n_s/2 \rfloor$ where $n_s$ the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \qquad \text{[Equation 2]}$$

Herein, $Y_{-1}=n_{RNTI}\neq 0$, $N_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, Calif. covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CON- NECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
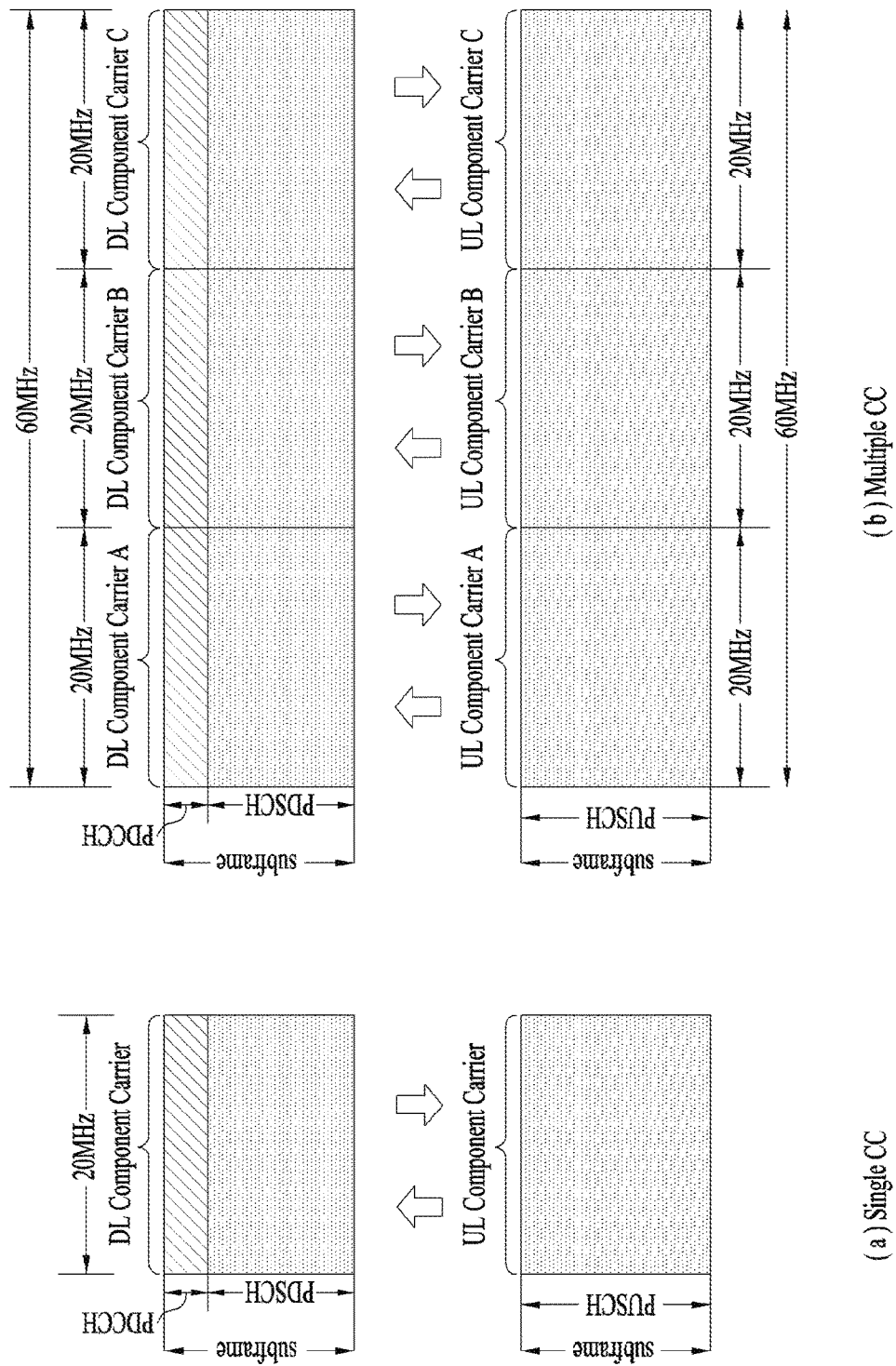
FIG. 6 is a view illustrating an example of Component Carriers (CCs) and Carrier Aggregation (CA) in a Long Term Evolution-Advanced (LTE-A) system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross-Carrier Scheduling

Two scheduling schemes, self-scheduling and cross-carrier scheduling are defined for a CA system, from the perspective of carriers or serving cells. Cross-carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross-carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross-carrier scheduling may be activated or deactivated UE-specifically and indicated to each UE semi-statically by higher-layer signaling (e.g. RRC signaling).

If cross-carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross-carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross-carrier scheduling is deactivated, this implies that the PDCCH monitoring set is always identical to the UE DL CC set. In this case, there is no need for signaling the PDCCH monitoring set. However, if cross-carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
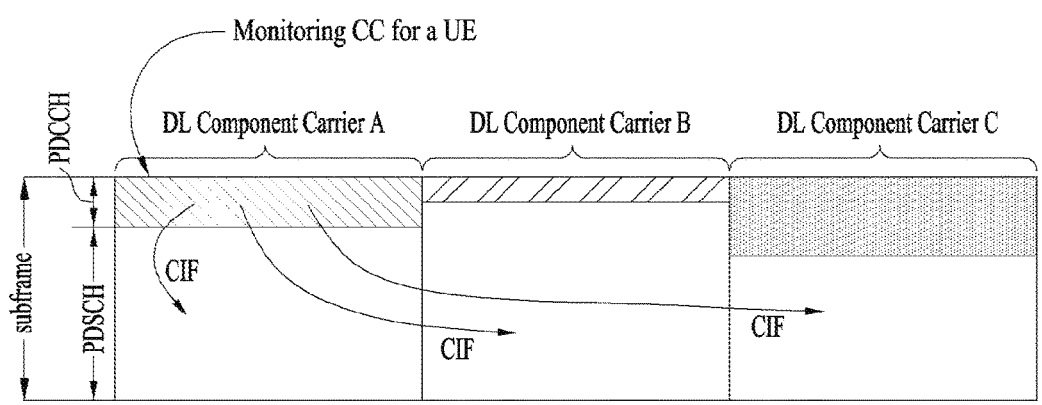
FIG. 7 is a view illustrating a subframe structure based on cross-carrier scheduling in the LTE-A system.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
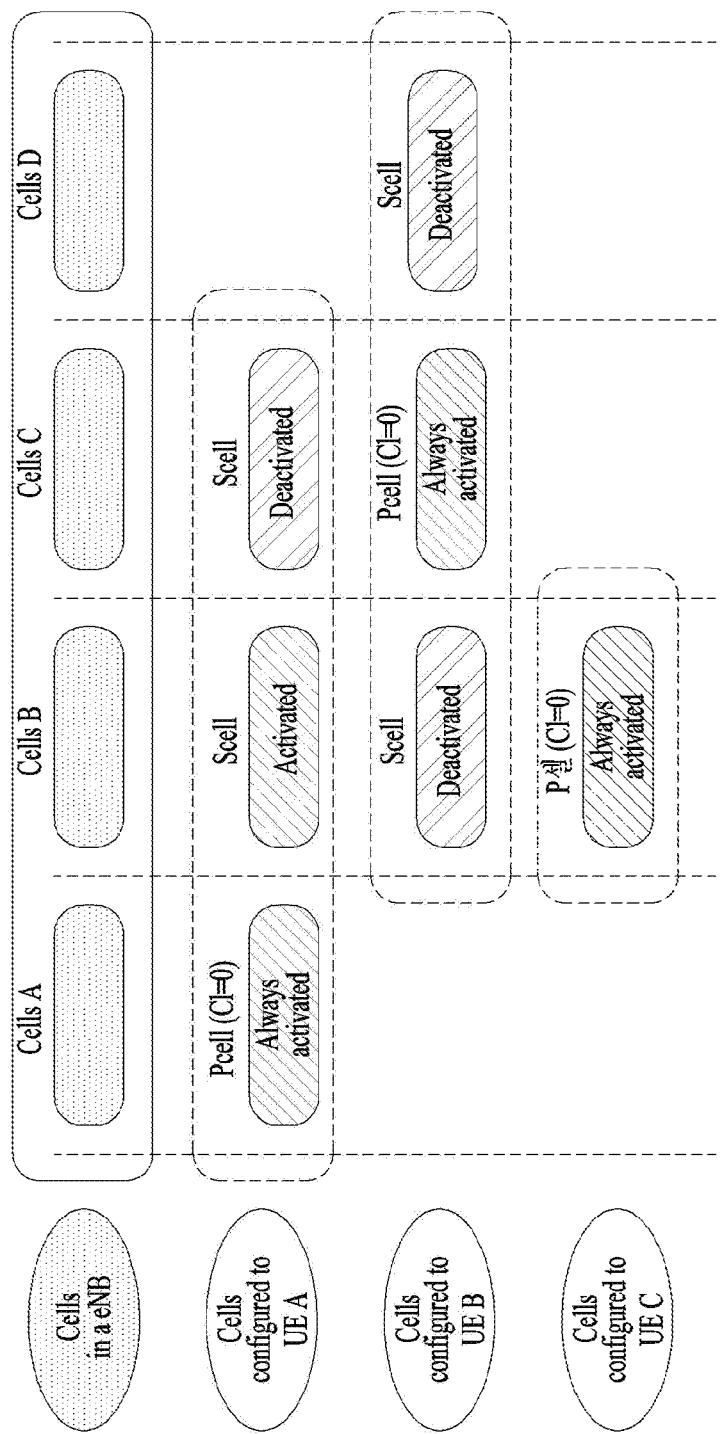
FIG. 8 is a view illustrating an exemplary serving cell configuration based on cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of PCell. In this case, PCell is always activated, and SCell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and Cell-specific Reference Signal (CRS) reporting and SRS transmission are interrupted.

2.3 CA Environment-Based CoMP Operation

Hereinafter, a cooperation multi-point (CoMP) transmission operation applicable to the embodiments of the present disclosure will be described.

In the LTE-A system, CoMP transmission may be implemented using a CA function in the LTE. FIG. 9 is a conceptual view illustrating a CoMP system operating based on a CA environment.

In FIG. 9, it is assumed that a carrier operated as a PCell and a carrier operated as an SCell may use the same frequency band on a frequency axis and are allocated to two eNBs geographically spaced apart from each other. At this time, a serving eNB of UE1 may be allocated to the PCell, and a neighboring cell causing much interference may be allocated to the SCell. That is, the eNB of the PCell and the eNB of the SCell may perform various DL/UL CoMP operations such as Joint Transmission (JT), CS/CB and dynamic cell selection for one UE.

FIG. 9 illustrates an example that cells managed by two eNBs are aggregated as PCell and SCell with respect to one UE (e.g., UE1). However, as another example, three or more cells may be aggregated. For example, some cells of three or more cells may be configured to perform CoMP operation for one UE in the same frequency band, and the other cells may be configured to perform simple CA operation in different frequency bands. At this time, the PCell does not always need to participate in CoMP operation.

2.4 Reference Signal (RS)

Hereinafter, reference signals are explained, which are used for the embodiments of the present invention.

Figure 10:
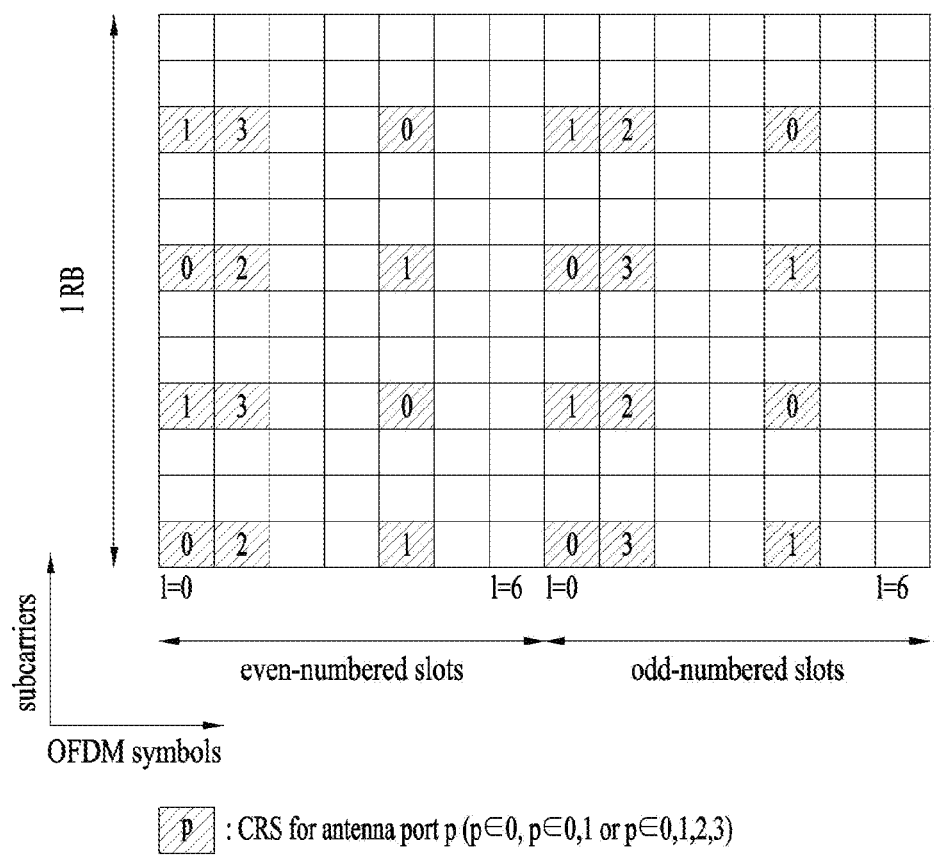
FIG. 10 is a view illustrating an example of a subframe to which a cell specific reference signal (CRS) that can be used in the embodiments of the present invention is allocated.

FIG. 10 illustrates a subframe to which CRSs are allocated, which may be used in embodiments of the present disclosure.

FIG. 10 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot ns.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a Channel State Information Reference Signal (CSI-RS) are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 11:
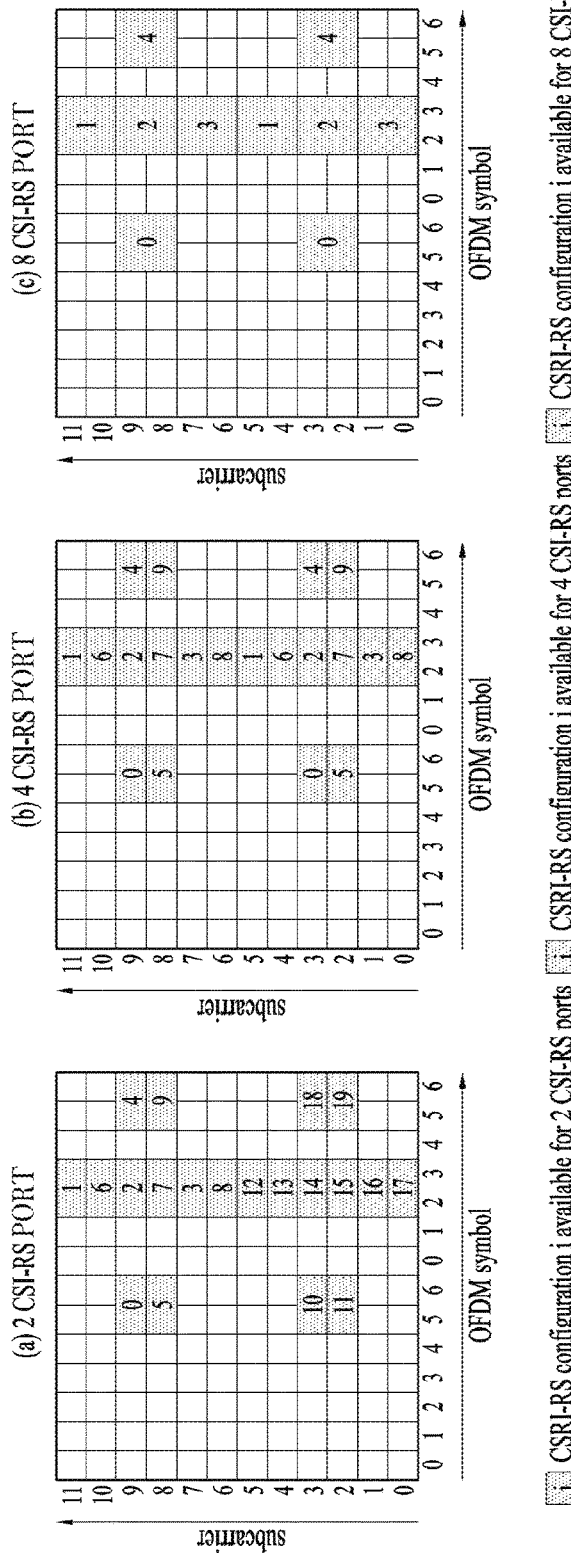
FIG. 11 is a view illustrating an example of subframes to which a CSI-RS that can be used in the embodiments of the present invention is allocated in accordance with the number of antenna ports.

FIG. 11 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 11 (a) illustrates 20 CSI-RS configurations 0 to 19 available for CSI-RS transmission through two CSI-RS ports among the CSI-RS configurations, FIG. 11 (b) illustrates 10 available CSI-RS configurations 0 to 9 through four CSI-RS ports among the CSI-RS configurations, and FIG. 11 (c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback Pc, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 6 shows CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying the following Equation 3 are subframes including CSI-RSs.

$$(10n_f+\lfloor n_s/2 \rfloor-\Delta_{CSI-RS}) \bmod T_{CSI-RS}=0 \quad \text{[Equation 3]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

2.5 Enhanced PDCCH (EPDCCH)

In the 3GPP LTE/LTE-A system, Cross-Carrier Scheduling (CCS) in an aggregation status for a plurality of component carriers (CC: component carrier=(serving) cell) will be defined. One scheduled CC may previously be configured to be DL/UL scheduled from another one scheduling CC (that is, to receive DL/UL grant PDCCH for a corresponding scheduled CC). At this time, the scheduling CC may basically perform DL/UL scheduling for itself. In other words, a Search Space (SS) for a PDCCH for scheduling scheduling/scheduled CCs which are in the CCS relation may exist in a control channel region of all the scheduling CCs.

Meanwhile, in the LTE system, FDD DL carrier or TDD DL subframes are configured to use first n (n<=4) OFDM symbols of each subframe for transmission of physical channels for transmission of various kinds of control information, wherein examples of the physical channels include a PDCCH, a PHICH, and a PCFICH. At this time, the number of OFDM symbols used for control channel transmission at each subframe may be delivered to the UE dynamically through a physical channel such as PCFICH or semi-statically through RRC signaling.

Figure 12:
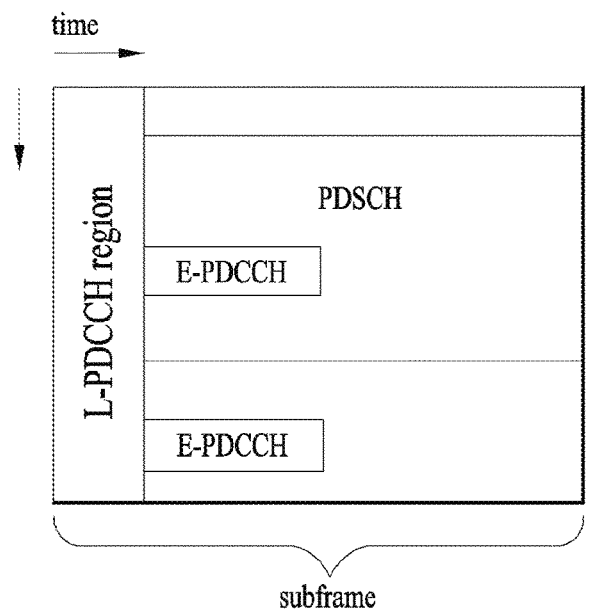
FIG. 12 is a view illustrating an example that legacy PDCCH, PDSCH and E-PDCCH, which are used in an LTE/LTE-A system, are multiplexed.

Meanwhile, in the LTE/LTE-A system, since a PDCCH which is a physical channel for DL/UL scheduling and transmitting various kinds of control information has a limitation that it is transmitted through limited OFDM symbols, Enhanced PDCCH (i.e., EPDCCH) multiplexed with a PDSCH more freely in a way of FDM/TDM may be introduced instead of a control channel such as PDCCH, which is transmitted through OFDM symbol and separated from PDSCH. FIG. 12 illustrates an example that legacy PDCCH, PDSCH and EPDCCH, which are used in an LTE/LTE-A system, are multiplexed.

2.6 Restricted CSI Measurement

To mitigate the effect of interference between cells in a wireless network, network entities may cooperate with each other. For example, other cells except a cell A transmit only common control information without transmitting data during the duration of a specific subframe for which the cell A transmits data, whereby interference with a user receiving data in the cell A may be minimized.

In this way, interference between cells may be mitigated by transmitting only minimal common control information from other cells except a cell transmitting data at a specific time through cooperation between cells in a network.

For this purpose, if a higher layer configures two CSI measurement subframe sets CCSI,0 and CCSI,1, a UE may perform Resource-Restricted Measurement (RRM). At this time, it is assumed that CSI reference resources corresponding to the two measurement subframe sets belong to only one of the two subframe sets.

The following Table 7 illustrates an example of a higher-layer signal that configures CSI subframe sets.

TABLE 7

```
CQI-ReportConfig-r10 ::= SEQUENCE {
    cqi-ReportAperiodic-r10    CQI-ReportAperiodic-r10
OPTIONAL, -- Need ON
    nomPDSCH-RS-EPRE-Offset    INTEGER (-1..6),
    cqi-ReportPeriodic-r10     CQI-ReportPeriodic-r10
OPTIONAL, -- Need ON
    pmi-RI-Report-r9           ENUMERATED {setup}    OPTIONAL,
-- Cond PMIRIPCell
    csi-SubframePatternConfig-r10    CHOICE {
        release    NULL,
        setup    SEQUENCE {
            csi-MeasSubframeSet1-r10    MeasSubframePattern-r10,
            csi-MeasSubframeSet2-r10    MeasSubframePattern-r10
        }
    }
OPTIONAL   -- Need ON
}
```

[Table 7] illustrates an example of CQI report configuration (CQI-Report Config) message transmitted to configure CSI subframe sets. The CQI-Report configuration message may include an aperiodic CQI report cqi-ReportAperiodic-r10 Information Element (IE), a nomPDSCH-RS-EPRE-Offset IE, a periodic CQI report cqi-ReportPeriodic-r10 IE, a PMI-RI report pmi-RI-Report-r9 IE, and a CSI subframe pattern configuration csi-subframePatternConfig 1E. At this time, the CSI subframe pattern configuration IE includes CSI measurement subframe set 1 information csi-MeasSubframeSet1 IE and a CSI measurement subframe set 2 information csi-MeasSubframeSet2 IE, which indicate measurement subframe patterns for the respective subframe sets.

In this case, each of the csi-MeasSubframeSet1-r10 IE and the csi-MeasSubframeSet2-r10 IE is 40-bit bitmap information representing information on subframes belonging to each subframe set. Also, aperiodic CQI report CQI-ReportAperiodic-r10 IE is used to configure an aperiodic CQI report for the UE, and the periodic CQI report CQI-ReportPeriodic-r10 is used to configure a periodic CQI report for the UE.

The nomPDSCH-RS-EPRE-Offset IE indicates a value of $\Delta_{offset}$. At this time, an actual value is set to $\Delta_{offset}$ value*2 [dB]. Also, the PMI-RI report IE indicates configuration or non-configuration of a PMI/RI report. Only when a transmission mode is set to TM8, TM9, or TM10, the E-UTRAN configures the PMI-RI Report IE.

3. LTE Unlicensed (LTE-U) System 3.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band.

Figure 13:
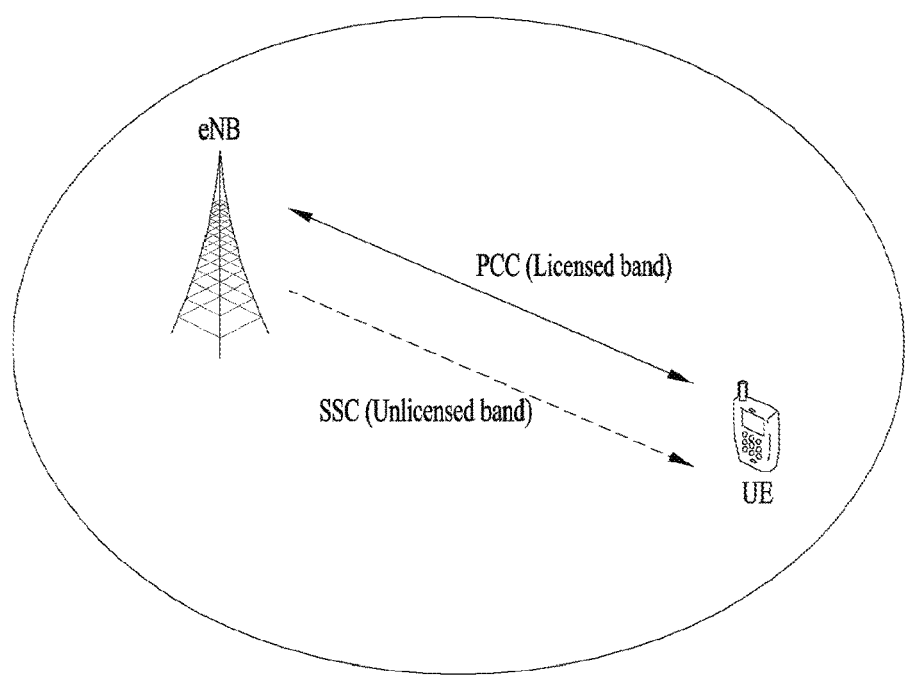
FIG. 13 is a view illustrating an example of a CA environment supported in an LTE-U system.

FIG. 13 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 13, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 13 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross-carrier scheduling mode and through PDCCH of the SCell in case of a self-scheduling mode, and may try data transmission and reception.

A CS procedure may be performed in the same manner as or a similar manner to a Listen Before Talk (LBT) procedure. In the LBT procedure, an eNB of a PCell determines whether the current state of a UCell (a cell operating in an unlicensed band) is busy or idle. For example, in the case where a Clear Channel Assessment (CCA) threshold is preset or configured by a higher-layer signal, if energy higher than the CCA threshold is detected in the UCell, the UCell is determined to be busy, and otherwise, the UCell is determined to be idle. If the UCell is determined to be idle, the eNB of the PCell may schedule resources of the UCell and perform data transmission and reception in the UCell by transmitting a scheduling grant (i.e., DCI or the like) on an (E)PDCCH of the PCell or a PDCCH of the UCell.

At this time, the eNB may configure a TxOP including N consecutive subframes. In this case, a value of N and a use of the N subframes may previously be notified from the eNB to the UE through higher layer signaling through the PCell or through a physical control channel or physical data channel. The TxOP duration comprised of M subframes may be referred to as a reserved resource period (RRP).

3.2 TxOP Duration

An eNB may transmit and receive data to and from one UE during a TxOP duration, and may configure a TxOP duration comprised of N consecutive subframes for each of a plurality of UEs and transmit and receive data in accordance with TDM or FDM. At this time, the eNB may transmit and receive data through a PCell which is a licensed band and an SCell which is an unlicensed band during the TxOP duration.

However, if the eNB transmits data in accordance with a subframe boundary of an LTE-A system corresponding to a licensed band, a timing gap may exist between an idle determination timing of the SCell which is an unlicensed band and an actual data transmission timing. Particularly, since the SCell should be used as an unlicensed band, which cannot be used exclusively by a corresponding eNB and a corresponding UE, through CS based contention, another system may try information transmission for the timing gap.

Therefore, the eNB may transmit a reservation signal from the SCell to prevent another system from trying information transmission for the timing gap. In this case, the reservation signal means a kind of "dummy information" or "a copy of a part of PDSCH" transmitted to reserve a corresponding resource region of the SCell as a resource of the eNB. The reservation signal may be transmitted for the timing gap (i.e., from the idle determination timing of the SCell to the actual transmission timing).

3.3 Method for Configuring TxOP Duration

Figure 14:
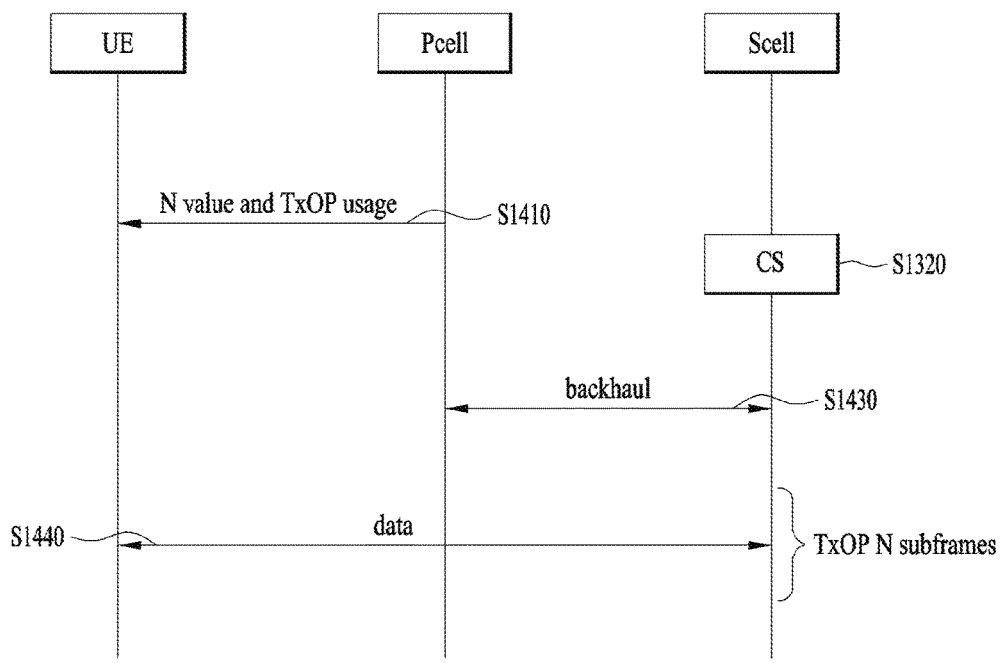
FIG. 14 is a diagram illustrating a signal flow for one of methods for configuring a Transmission Opportunity (TxOP)

FIG. 14 illustrates one of methods for configuring a TxOP duration.

An eNB may previously configure a TxOP duration semi-statically through a PCell. For example, the eNB may transmit a value of N corresponding to the number of subframes constituting the TxOP duration and configuration information on a use of the corresponding TxOP duration to a UE through a higher layer signal (for example, RRC signal) (S1410).

However, the step S1410 may be performed dynamically in accordance with system configuration. In this case, the eNB may transmit configuration information on the TxOP duration to the UE through a PDCCH or EPDCCH.

The SCell may perform a Carrier Sensing (CS) procedure to check whether a current channel state is an idle state or a busy state (S1420).

The PCell and the SCell may be managed by their respective eNBs different from each other or the same eNB. However, if the PCell and the SCell are managed by different base stations, information on a channel state of the SCell may be delivered to the PCell through a backhaul (S1430).

Afterwards, at a subframe configured as the TxOP duration, the UE may transmit and receive data through the PCell and the SCell. If the use of the corresponding TxOP is configured for downlink data transmission in step S1410, the UE may receive DL data through the SCell during the TxOP duration, and if the use of the corresponding TxOP is configured for uplink data transmission in step S1310, the UE may transmit UL data through the SCell (S1440).

4. Method of Reporting CSI on Unlicensed Band 4.1 Method of Configuring PAP and Non-PAP It is preferable to prepare for a case that an UCell is unable to occupy a channel for a long time due to an LBT process (and/or CS process). In particular, in embodiments of the present invention, it may be able to configure a period in which data is unconditionally transmitted without performing LBT in Ucell.

Or, while LBT is performed, it may be able to configure an eNB of a Pcell to attempt to aggressively access a channel by configuring a relatively higher CCA threshold for a specific period.

Or, it may configure an exclusive channel access period by exchanging information between intra operator inter cells and/or inter operators, and/or inter radio access technologies (RATs) (e.g., WiFi).

This period is defined as a preoccupied access period (PAP). And, a period except the PAP is defined as a non-PAP. In this case, the (non-)PAP can be cell-specifically or UE-specifically configured.

In the embodiments of the present invention, the (non-)PAP can be configured via higher layer signaling (e.g., RRC or MAC signal) or physical layer signaling (e.g., PDCCH or E-PDCCH).

4.2 Method of Configuring Restricted CSI Measurement Set in Unlicensed Band

In the embodiments of the present invention, if a PAP is defined as a period in which LBT process (or CS process) is not performed, the PAP is vulnerable to interference of inter-operator UCell or WiFi system compared to non-PAP. In particular, since a CSI measurement result performed on the non-PAP and the PAP may be differentiated, it is preferable to differently configure a restricted CSI measurement set for each period.

For example, the non-PAP and the PAP can be configured by a CSI subframe set 0 and a CSI subframe set 1, respectively. In this case, a periodic CSI report can be configured for each of the CSI subframe sets.

Aperiodic CSI report triggering can be initiated irrespective of a CSI subframe set. Yet, it may be able to define as CSI report triggering is configured in a TxOP period belonging to the PAP and the non-PAP only. This is because, since such interference as WiFi system can be measured in a period rather than the TxOP period belonging to the non-PAP, a low MCS level may be allocated due to an amount of interference greater than interference to be measured in actual RRP. In particular, in the embodiments of the present invention, a UE may consider that aperiodic CSI report, which is triggered in a period rather than the TxOP period belonging to the non-PAP, is invalid.

According to a legacy LTE/LTE-A system, periodic or aperiodic CSI reporting can be performed on all CSI subframe sets. However, according to the embodiments of the present invention, CSI reporting can be performed on a single CSI subframe set only among CSI subframe sets according to the characteristic of the PAP or the non-PAP.

4.2.1 Periodic CSI Reporting

Since a probability of actually transmitting data during PAP is much higher than a probability of transmitting data during non-PAP, a periodic CSI report transmitted by a UE during the PAP is more meaningful than a CSI report transmitted during the non-PAP.

If LBT is performed during the non-PAP and an Ucell is determined as in a busy state, impact of interference due to WiFi and the like might be relatively less compared to impact of LBT performed during the PAP. Hence, an eNB may have a bigger link adaptation effect by reception of reporting periodic CSI during the non-PAP.

Hence, an eNB of a Pcell can configure a periodic CSI report on a specific CSI subframe set only among two CSI subframe sets including a set 0 and a set 1 established to the non-PAP or the PAP in the UCell.

In case of LTE/LTE-A system, if two CSI subframe sets are configured to a UE, the UE performs CSI reporting on the two CSI subframe sets. According to the present embodiment, it may be able to configure periodic CSI reporting to be performed on either a subframe set 0 or a subframe set 1 configured in an unlicensed band.

Figure 15:
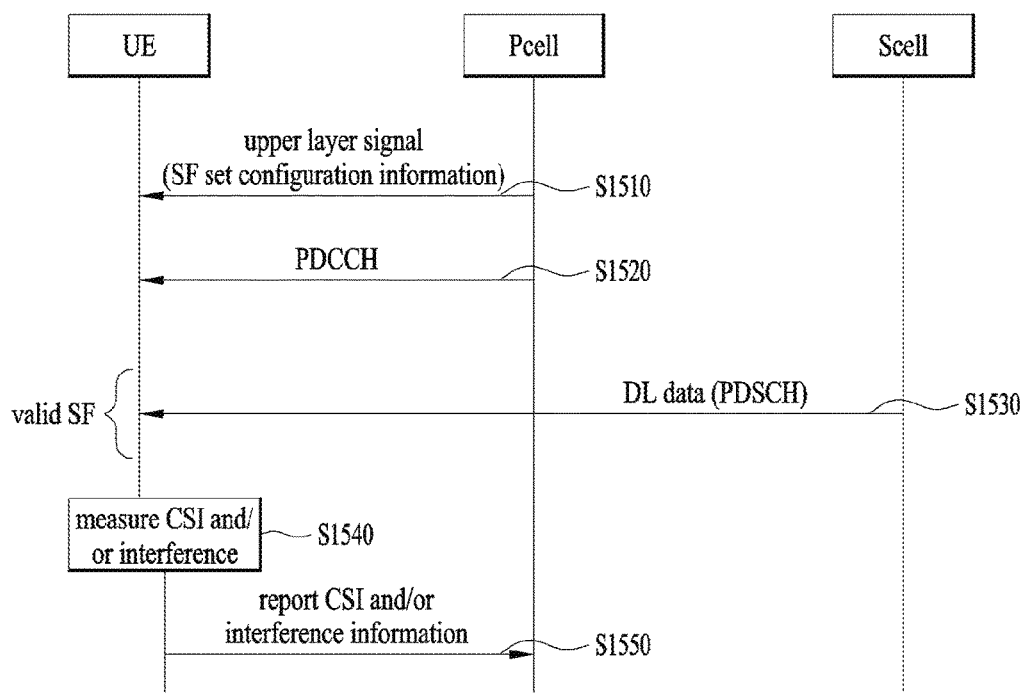
FIG. 15 is a flowchart for explaining one of methods of performing periodic CSI reporting on a subframe set configured on an unlicensed band.

FIG. 15 is a flowchart for explaining one of methods of performing periodic CSI reporting on a subframe set configured on an unlicensed band.

Referring to FIG. 15, an eNB of a Pcell supporting a licensed band (i.e., LTE-A system band) can transmit subframe set (SF set) configuration information on an Scell (or Ucell) supporting an unlicensed band to a UE using an upper layer signal. In this case, the SF set configuration information can be respectively configured by a CSI subframe set 0 and a CSI subframe set 1 in response to a non-PAP and a PAP set to the Scell [S1510].

If the Pcell and the Scell are configured by a CCS (Cross Carrier Scheduling) scheme, the eNB of the Pcell can transmit PDCCH or E-PDCCH (hereinafter, (E)PDCCH) including scheduling information on a TXOP belonging to the PAP or the non-PAP of the Scell. If the Pcell and the Scell are configured by a SCS (Self Carrier Scheduling) scheme, (E)PDCCH can be transmitted via the Scell [S1520].

The Scell can transmit DL data to the UE via PDSCH based on the scheduling information transmitted via (E)PDCCH. In this case, the UE can receive the DL data in a valid subframe (SF). In this case, the valid SF may correspond to an SF configured in the PAP or an SF corresponding to the TXOP belonging to the non-PAP [S1530].

The UE can measure CSI and/or interference on the valid SF. In this case, the UE can be configured to measure the CSI and/or the interference on the CSI subframe set 0 or the CSI subframe set 1 only. For example, the UE can measure the CSI on the CSI subframe set 1 assigned to the PAP. Or, the UE can measure the CSI or the interference on the CSI subframe set 0 corresponding to the TxOP belonging to the non-PAP [S1540].

The UE can periodically report the CSI and/or the interference measured via PUCCH or PUSCH to the eNB of the Pcell or the Scell [S1550].

4.2.2 Aperiodic CSI Reporting

The restricted CSI measurement set can be configured by Rel-12 CSI subframe set as well. For example, non-PAP and PAP can be configured by Rel-12 CSI subframe set 0 and Rel-12 CSI subframe set 1, respectively.

In this case, an aperiodic CSI trigger can indicate a CSI subframe set in which CSI reporting is triggered among the two restricted CSI measurement sets. In particular, an aperiodic CSI request field (i.e., CSI trigger) included in PDCCH can be configured to indicate a CSI subframe set becoming a target of aperiodic CSI reporting. For example, when the CSI request field is configured by 2 bits, if the CSI request field is set to '00', it indicates that aperiodic CSI reporting for the CSI subframe set 0 is triggered. If the CSI request field is set to '01', it indicates that aperiodic CSI reporting for the CSI subframe set 1 is triggered. A configuration value of the CSI request field may change depending on a system.

A UE of LTE system (Rel-10) can measure CSI on a CSI subframe set configured to the UE only. On the contrary, a UE of LTE-A system (Rel-12) can measure and report CSI not only on a CSI subframe set configured to the UE but also on a different CSI subframe set. Hence, a UE according to the embodiments of the present invention can measure CSI on the CSI subframe set 1 and the CSI subframe set 2 respectively set to the PAP and the non-PAP and may be able to report the CSI according to a CSI request field transmitted from an eNB.

Figure 16:
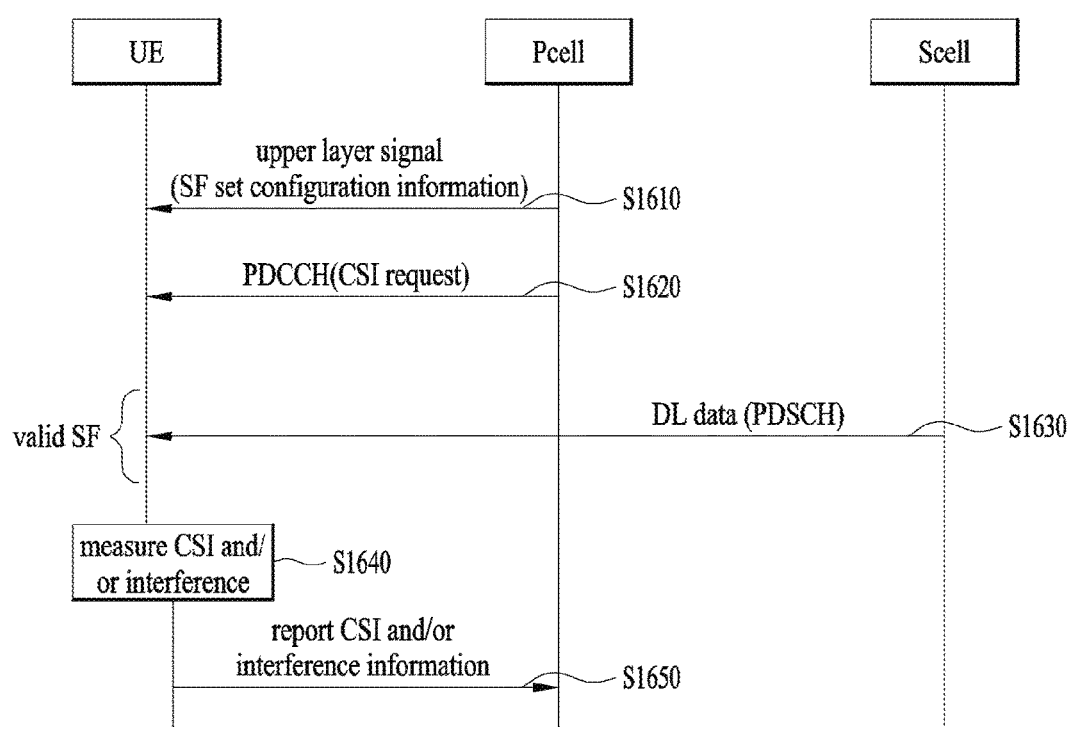
FIG. 16 is a flowchart for explaining one of methods of performing aperiodic CSI reporting on a subframe set configured on a licensed band.

FIG. 16 is a flowchart for explaining one of methods of performing aperiodic CSI reporting on a subframe set configured on a licensed band.

Referring to FIG. 16, an eNB of a Pcell supporting a licensed band (i.e., LTE-A system band) can transmit subframe set (SF set) configuration information on an Scell (or Ucell) supporting an unlicensed band to a UE using an upper layer signal. In this case, the SF set configuration information can be respectively configured by a CSI subframe set 0 and a CSI subframe set 1 in response to a non-PAP and a PAP set to the Scell [S1610].

If the Pcell and the Scell are configured by a CCS (Cross Carrier Scheduling) scheme, the eNB of the Pcell can transmit (E)PDCCH including scheduling information on a TXOP belonging to the PAP or the non-PAP of the Scell. If the Pcell and the Scell are configured by a SCS (Self Carrier Scheduling) scheme, (E)PDCCH can be transmitted via the Scell. In this case, in order to trigger aperiodic CSI reporting, the eNB can transmit the (E)PDCCH to the UE in a manner of further including a CSI request field in the (E)PDCCH [S1620].

In this case, the CSI request field transmitted in the step S1620 can indicate CSI on the CSI SF set 1 for the PAP or the CSI SF set 0 for the non-PAP to be reported.

The Scell can transmit DL data to the UE via PDSCH based on the scheduling information transmitted via PDCCH. In this case, the UE can receive the DL data in a valid subframe (SF). In this case, the valid SF may correspond to an SF configured in the PAP or an SF corresponding to the TXOP belonging to the non-PAP [S1630].

The UE can measure CSI and/or interference on the valid SF. In this case, the UE can be configured to measure the CSI and/or the interference on the CSI subframe set 0 or the CSI subframe set 1. For example, the UE can measure the CSI on the CSI subframe set 1 assigned to the PAP. Or, the UE can measure the CSI and/or the interference on the CSI subframe set 0 corresponding to the TxOP belonging to the non-PAP [S1640].

The UE can aperiodically report CSI on a CSI subframe set indicated by the CSI request field in the step S1620 among CSI on the CSI subframe set 0 and the CSI subframe set 1. In this case, aperiodic CSI can be transmitted to the Pcell or the Scell via PUSCH [S1650].

4.2.3 Interference Measurement

An eNB attempts to transmit data during a configured PAP, whereas the eNB attempts to transmit data during a non-PAP only when a channel is idle (i.e., during a configured TxOP period only) after LBT is performed.

If a TxOP period is not configured during the non-PAP, unexpected interference may occur due to WiFi system or inter-operator LTE eNBs. Hence, when interference measurement is performed during the non-PAP, it is necessary for a UE to perform time domain averaging on interference amount measured for the TxOP period. In particular, in order for the UE to perform interference measurement, it is necessary to utilize not only PAP configuration but also TxOP period configuration information.

According to the embodiment of the present invention, in order to reduce complexity, it may be able to configure the UE to perform interference measurement in the PAP only. For example, if the PAP and the non-PAP are defined by a CSI subframe set 0 and a CSI subframe set 1, respectively, the UE can perform the interference measurement on the CSI subframe set 1 only.

Assume a case that FeICIC (Further enhanced Inter-Cell Interference Coordination) or NAICS (Network Assisted Interference Cancellation and Suppression) is used. When an eNB informs a UE of information (e.g., cell ID, port number, RS type, Tx power, SF usage, etc.) on a cell of strong interference (i.e., aggressor cell), it may be able to define the information to be valid in the PAP only. This is because whether or not the aggressor cell performs data transmission is not deterministic in the non-PAP.

Or, the information on the aggressor cell received by the UE is guaranteed in the PAP only. It may be able to configure the UE to determine whether or not the aggressor cell actually performs data transmission via BD (blind detection) during the non-PAP.

For example, when the UE measures CSI or the UE measures interference only in FIGS. 15 and 16, the UE can measure the interference in a CSI subframe set only which is defined during the PAP.

4.2.4 Differential Power Control

If PAP is defined as a period in which LBT process (or CS process) is not performed, a neighbor cell or WiFi system can be affected by strong interference during the PAP. Hence, power configuration can be differently configured depending on the PAP and the non-PAP. For example, it may be able to differently configure a downlink power adjustment-related parameter (e.g., P_a, P_b, P_c, etc.) according to a CSI subframe set.

And, since interference environment and transmit power are differently configured depending on the PAP and the non-PAP, it may be able to differently configure a TM (transmission mode) or whether or not PDSCH CRS is transmitted. For example, since an eNB is able to perform transmission by reducing power during the PAP in an Scell, in order to raise success rate of PDSCH transmission, it may be able to configure and transmit PDSCH (e.g., MBMS subframe) to DM-RS-based TM (i.e., TM 9 or higher) UEs only rather than CRS-based TM UEs without transmitting a CRS.

The downlink power adjustment-related parameter can be transmitted to a UE via higher layer signaling or physical layer signaling. Referring to FIGS. 15 and 16, in the steps S1510 and S1610 (or, steps S1520 and S1620), the eNB can transmit the downlink power adjustment-related parameter to the UE. In the steps S1530 and S1630, the UE can receive the DL data with reference to downlink power which is differently configured according to the PAP or the non-PAP.

4.3 Method of Reporting CSI when Restricted Measurement Set is not Configured

In embodiment described in the following, a method of reporting CSI is explained when a restricted CSI measurement set is not configured depending on PAP and non-PAP.

4.3.1 Periodic CSI reporting

To this end, an eNB can configure the PAP as a valid CSI measurement period only or configure a TxOP period of the non-PAP as a valid CSI measurement period only. If the TxOP period of the non-PAP is configured as a valid CSI measurement period only, periodic CSI report can be restrictively performed during the TxOP period of the non-PAP only. For example, in FIG. 15, the UE measures CSI on a CSI subframe set during the TxOP period of the non-PAP and the PAP and may be able to periodically report the measured CSI to the eNB.

4.3.2 Aperiodic CSI reporting

A UE may assume that aperiodic CSI triggering in a valid CSI measurement period is valid only. Aperiodic CSI triggering in the remaining period can be configured to be ignored. For example, in FIG. 16, the UE can perform CSI reporting on aperiodic CSI triggering transmitted during the PAP and/or aperiodic CSI triggering transmitted during the TxOP period of the non-PAP only.

Or, the UE can be configured to perform CSI reporting on a period rather than a valid CSI measurement period via an aperiodic CSI request field. For example, if a value of the aperiodic CSI request field is set to '01', it may indicate that CSI reporting on a valid measurement period is triggered. If the value of the aperiodic CSI request field is set to '10', it may indicate that CSI reporting on an invalid measurement period is triggered. For example, referring to FIG. 16, in the step S1620, if the CSI request field is set to '01', the UE can report CSI on the PAP and/or the TxOP period of the non-PAP only to the eNB. If the CSI request field is set to '10', the UE can report CSI measured from a period rather than the TxOP period of the non-PAP to the eNB.

4.3.3 RRM Measurement-1

According to LTE-A system (i.e., Rel-12 system), restricted RRM (Radio Resource Management) measurement is defined not to be performed on a Scell.

If PAP is defined as a period in which LBT is not performed, it may be able to define RRM measurement to be performed during TxOP period of non-PAP only, which is not relatively exposed to interference of WiFi and the like.

Or, if the PAP is defined as an exclusive channel access period configured via information exchanged between cells, RRM measurement can be configured to be performed during the PAP only. In particular, it may be able to configure the restricted RRM measurement to be specifically performed for an UCell.

4.4 Inter Cell Coordination

In order to efficiently utilize resources, it may be able to considerably reduce interference by orthogonally using the resources for PAP via information exchanged between cells or operators.

Since the PAP and the non-PAP are configured semi-statically rather than dynamically in Scell, it may be able to exchange and share PAP configuration information between cells or operators via a backhaul despite of signaling latency of certain degree.

4.4.1 Sharing PAP Configuration Information Between Operators-1

In the following, a method of sharing PAP configuration information between intra-operator eNBs is explained.

If PAP configuration information is shared, it may be able to configure all eNBs managed by a different operator to perform the same operation during the PAP. For example, all eNBs may not perform LBT during the configured PAP. In this case, the PAP configuration information shared by all eNBs may correspond to a start point of the PAP and a length of the PAP (or an end point of the PAP).

If all eNBs attempt to perform transmission during the PAP, performance deterioration of UEs located at a cell boundary gets worse. Hence, if the UEs use the PAP using the TDM scheme, it may be able to mitigate interference. For example, if two neighboring eNBs use the PAP in a manner of dividing the PAP into two PAPs using the TDM scheme, it may avoid interference.

More specifically, assume a case that the PAP is configured during 10 ms and non-PAP is configured during next 20 ms. In this case, the 10 ms is divided in half by neighboring eNB1 and eNB2. During the first 5 ms, the eNB1 may transmit DL data and the eNB2 may not attempt transmission. Or, the first 5 ms can be configured as non-PAP. During the remaining 5 ms, the eNB2 transmits DL data and the eNB1 may not attempt transmission. Or, the remaining 5 ms can be configured as non-PAP.

Alternately, instead of evenly using the PAP, the eNB1 and the eNB2 may differently use the PAP according to a traffic load state. In particular, it may be able to assign more PAP to an eNB of bigger traffic load.

4.4.2 Sharing PAP Configuration Information Between Operators-2

In the following, a different method of sharing PAP configuration information between intra-operator eNBs is explained.

If a specific eNB unconditionally transmits DL data without considering an eNB of a different operator during PAP, the specific eNB can be periodically interfered by strong interference of the eNB of the different operator during the PAP. Hence, it is necessary to reduce interference via coordination between operators.

For example, the PAP can be configured using TDM. PAP configured by an eNB of an operator A can be configured as non-PAP by eNBs of an operator B. Or, PAP configured by the operator B can be configured as non-PAP by eNBs of the operator A. In this case, an operation of the PAP configured by each operator can be defined by the method mentioned earlier in the paragraph 4.4.1.

It may be able to configure PAP using a scheme different from the schemes mentioned earlier in the paragraphs 4.4.1 and 4.4.2. For example, an eNB1 of an operator 1 may be able to implicitly inform an eNB2 of an operator 2 that a period is configured as PAP by transmitting a preamble at a start point and/or an end point of the PAP (or non-PAP).

4.5 RRM Measurement-2

When a UE performs RRM measurement on a neighboring cell, the RRM measurement may vary depending on whether the adjacent cell is in PAP or non-PAP. In this case, information on whether the adjacent cell is in the PAP or the non-PAP can be obtained via the inter-cell coordination method mentioned earlier in the paragraph 4.4.

If the adjacent cell is in the non-PAP, since DL data is not transmitted all the time in the cell, it is necessary for a UE to have additional information indicating whether or not the adjacent cell is in a TxOP period. The UE can perform RRM measurement only when the adjacent cell is in the TxOP period.

However, since the TxOP period is dynamically configured, it may be difficult to perform inter-cell coordination via a backhaul. Hence, an eNB forwards PAP configuration information of the adjacent cell to each UE and each UE can perform the RRM measurement on the adjacent cell during the PAP only. In particular, the UE performs the RRM measurement only when the adjacent cell is in the PAP. If the adjacent cell is in the non-PAP, the UE is configured not to perform the RRM measurement.

5. Apparatuses

Figure 17:
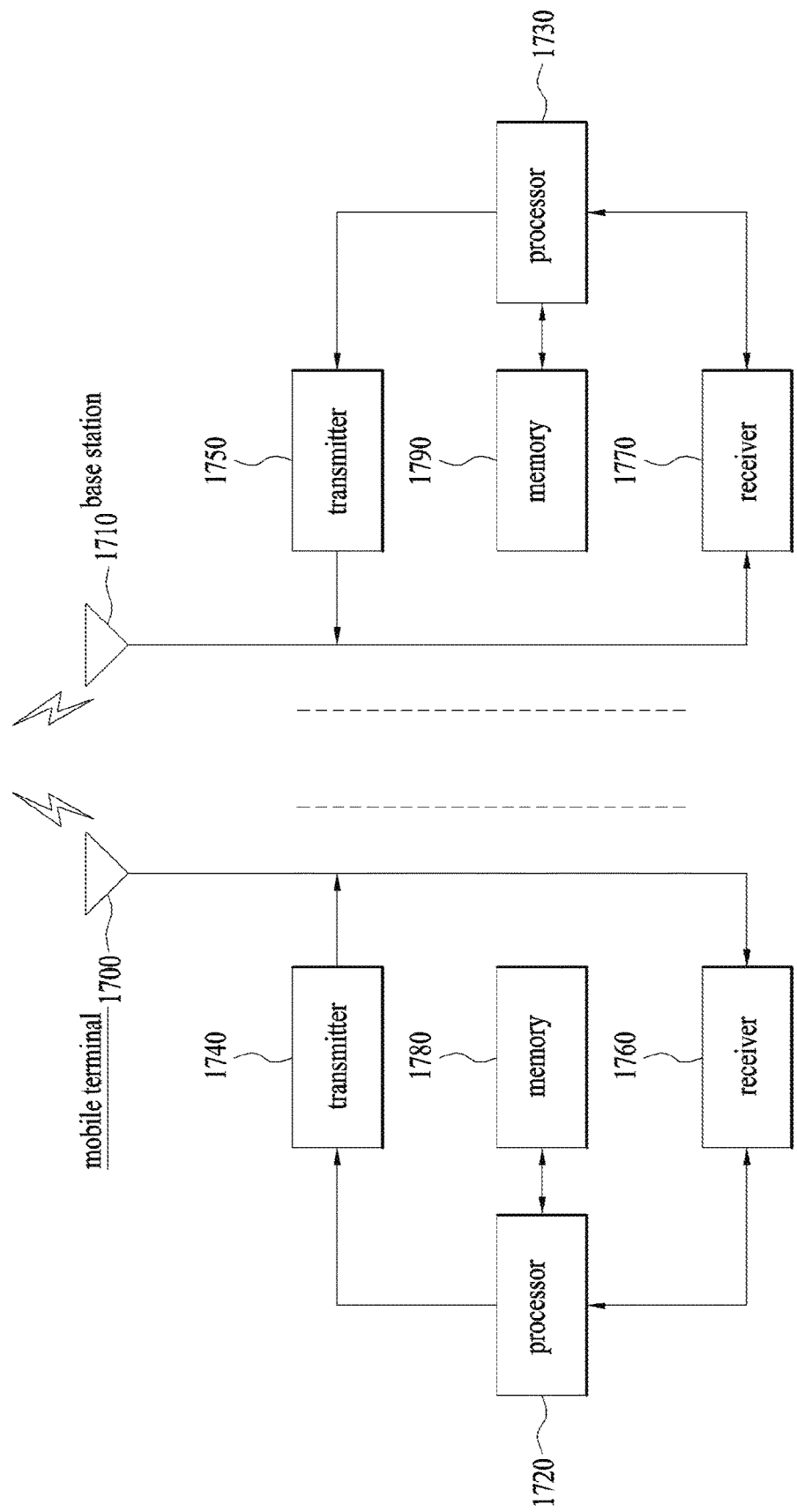
FIG. 17 is a diagram for means capable of implementing the methods mentioned earlier in FIGS. 1 to 16.

Apparatuses illustrated in FIG. 17 are means that can implement the methods described before with reference to FIGS. 1 to 16.

A UE may act as a transmitter on a UL and as a receiver on a DL. An eNB may act as a receiver on a UL and as a transmitter on a DL.

That is, each of the UE and the eNB may include a transmitter 1740 or 1750 and a receiver 1760 or 1770, for controlling transmission and reception of information, data, and/or messages, and an antenna 1700 or 1710 for transmitting and receiving information, data, and/or messages.

Each of the UE and the eNB may further include a processor 1720 or 1730 for implementing the afore-described embodiments of the present disclosure and a memory 1780 or 1790 for temporarily or permanently storing operations of the processor 1720 or 1730.

The embodiments of the present invention can be performed using the configuration component and the functions of the UE and the eNB. For example, the eNB configures PAP and non-PAP and configure each of the PAP and the non-PAP as a CSI subframe set, respectively. The eNB can transmit configuration information on the CSI subframe set to the UE via higher layer signaling. The UE measures CSI on the CSI subframe set during the PAP or the non-PAP and may be able to periodically or aperiodically report the measured CSI to the eNB. In this case, periodic CSI can be defined for one CSI subframe set only among the two CSI subframe sets set to the UE. For details, it may refer to the paragraphs 1 to 4.

The transmitters and the receivers of the UE and the eNB may perform a packet modulation/demodulation function for data transmission, a high-speed packet channel coding function, OFDMA packet scheduling, TDD packet scheduling, and/or channelization. Each of the UE and the eNB of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1780 or 1790 and executed by the processor 1720 or 1730. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of reporting channel state information (CSI) in a wireless access system supporting an unlicensed band, the method performed by a user equipment (UE) and comprising:

receiving an upper layer signal containing CSI subframe set configuration information and an information on cell of interference from an evolved Node B (eNB) via a primary cell (PCell);

measuring CSI on a secondary cell (SCell) and an interference amount on a neighboring cell during at least one of a preoccupied access period (PAP) and a non-PAP divided in a time axis based on the CSI subframe set configuration information, wherein an interference amount for the PAP is measured by using the information on cell of interference received from the eNB, and wherein an interference amount for the non-PAP is measured by averaging, in a time domain, an interference amount measured during a transmission opportunity (TxOP) period; and transmitting a CSI report containing the measured CSI and interference information containing the measured interference amount for the PAP and the measured interference amount for the non-PAP to the eNB, wherein the non-PAP is configured by a first CSI subframe set and available to transmit and receive data only in the TxOP period in which the SCell is in an idle state, wherein the PAP is configured by a second CSI subframe set and available to transmit and receive data irrespective of whether or not the SCell is in the idle state, wherein the first CSI subframe set and the second CSI subframe set are set to the UE through the CSI subframe set configuration information, and wherein the SCell is configured in the unlicensed band.

2. The method of claim 1, wherein if the CSI report corresponds to a periodically transmitted periodic report, the UE transmits the CSI report to the eNB by measuring CSI on the second CSI subframe set only.

3. The method of claim 1, wherein if the CSI report corresponds to a periodically transmitted periodic report, the UE transmits the CSI report to the eNB by measuring CSI in the TxOP belonging to the first CSI subframe set.

4. The method of claim 1, wherein if the CSI report corresponds to an aperiodic CSI report which is reported upon a request of the eNB, the method further comprises receiving a physical downlink control channel containing an aperiodic CSI request field from the PCell, wherein the aperiodic CSI request field is configured to request a CSI report on the first CSI subframe set or the second CSI subframe set.

5. The method of claim 1, further comprising:

receiving downlink data from the SCell, wherein a power control parameter for transmitting the downlink data is differently configured depending on the first subframe set and the second subframe set.

6. A user equipment (UE) for reporting channel state information (CSI) in a wireless access system supporting an unlicensed band, the UE comprising:

a transmitter;

a receiver; and a processor configured to report the CSI in a manner of being functionally connected with the transmitter and the receiver, wherein the processor is configured to:

control the receiver to receive an upper layer signal containing CSI subframe set configuration information and information on cell of interference from an evolved Node B (eNB) via a primary cell (PCell), measure CSI on a secondary cell (SCell) and an interference amount on a neighboring cell during at least one of a preoccupied access period (PAP) and a non-PAP divided in a time axis based on the CSI subframe set configuration information, and control the transmitter to transmit a CSI report containing the measured CSI and interference information containing measured interference amount for the PAP and measured interference amount for the non-PAP to the eNB, wherein the interference amount for the PAP is measured by using the information on cell of interference received from the eNB, wherein the interference amount for the non-PAP is measured by averaging, in a time domain, an interference amount measured during a transmission opportunity (TxOP) period, wherein the non-PAP is configured by a first CSI subframe set and available to transmit and receive data only in the TxOP period in which the SCell is in an idle state, wherein the PAP is configured by a second CSI subframe set and available to transmit and receive data irrespective of whether or not the SCell is in the idle state, wherein the first CSI subframe set and the second CSI subframe set are set to the UE through the CSI subframe set configuration information, and wherein the SCell is configured in the unlicensed band.

7. The UE of claim 6, wherein if the CSI report corresponds to a periodically transmitted periodic report, the UE transmits the CSI report to the eNB by measuring CSI on the second CSI subframe set only.

8. The UE of claim 6, wherein if the CSI report corresponds to a periodically transmitted periodic report, the UE transmits the CSI report to the eNB by measuring CSI in the TxOP belonging to the first CSI subframe set.

9. The UE of claim 6, wherein if the CSI report corresponds to an aperiodic CSI report which is reported upon a request of the eNB, the processor is configured to control the receiver to receive a physical downlink control channel containing an aperiodic CSI request field from the PCell, wherein the aperiodic CSI request field is configured to request a CSI report on the first CSI subframe set or the second CSI subframe set.

10. The UE of claim 6, wherein the processor is configured to receive downlink data from the SCell and wherein a power control parameter for transmitting the downlink data is differently configured depending on the first subframe set and the second subframe set.

* * * * *